United States Patent [19]

Teper et al.

[11] Patent Number: 5,815,665

[45] Date of Patent: Sep. 29, 1998

[54] SYSTEM AND METHOD FOR PROVIDING TRUSTED BROKERING SERVICES OVER A DISTRIBUTED NETWORK

[75] Inventors: Jeffrey A. Teper, Redmond; Sudheer Koneru, Northbend; Gordon Mangione; Rudolph Balaz, both of Redmond; Aaron M. Contorer, Kirkland; Lucy Chao, Redmond, all of Wash.

[73] Assignee: Microsoft Corporation, Redmond, Wash.

[21] Appl. No.: 626,460

[22] Filed: Apr. 3, 1996

[51] Int. Cl.⁶ .................................................. H01J 13/00
[52] U.S. Cl. ..................................... 395/200.59; 705/26
[58] Field of Search ........................... 395/200.59; 705/26

[56] References Cited

PUBLICATIONS

Sirbu, Marvin A; "Internet Billing Service Design and Implementation" 1993.
Cox, Benjamin T. H.; "Maintaining Privacy in Electronic Transactions" Aug. 1994.
Sirbu, Marvin; J.D. Tygar; NetBill: An Internet Commerce System Optimized for Network Delivered Services, Mar. 1995.
Cox, Benjamin; Tygar, J.D.; Sirbu Marvin; "NetBill Security and Transaction Protocol" Jul. 1995.
Schneier, Bruce; "Applied Cryptography: protocols, algorithms, and source code", library of congress No. TX–4–216–579, Oct. 1995.
http://www.ini.cmu.edu/netbill/pubs.html, Apr. 1997.
PC Magazine; vol. 13; No. 18, p. 87; ISSN: 0888–8507; "Needed: A Fee–Based Internet"; Bill Machrone; Oct. 25, 1994.
Information Week; Client–Server; p. 84; "A Standard For Safety—Net Providers Strive For Encryption and Authentication"; Jan. 30, 1995.

Business Week; Cover Story; No. 3398; p. 88; "Shielding The Net From Cyber–Scoundrels"; Edward C. Baig and John Carey; Nov. 14, 1994.

(List continued on next page.)

*Primary Examiner*—Frank J. Asta
*Assistant Examiner*—Daniel Patru
*Attorney, Agent, or Firm*—Leydig, Voit & Mayer, Ltd.

[57] ABSTRACT

An Online Brokering Service provides user authentication and billing services to allow users to anonymously and securely purchase online services from Service Providers (SP) sites (e.g., World Wide Web sites) over a distributed public network, which may be an untrusted public network such as the Internet. Users and SP sites initially register with the Brokering Service, and are provided with respective client and server software components for using the Brokering Service. In one embodiment, when a user initially connects to an SP site, the SP site transmits a challenge message over the public network to the user computer, and the user computer generates and returns and cryptographic response message (preferably generated using a password of the user). The SP site then passes the response message to the Brokering Service, which in-turn looks up the user's password and authenticates the response message. If the response message is authentic, the Online Brokering Service transmits an anonymous ID to the SP site, which can be used for subsequently billing the user. In addition, the Online Brokering Service transmits user-specific access rights data to the SP site, allowing the SP site to customize its services for the particular user. Billing events generated by the SP sites are transmitted to the Brokering Service, which maintains a user-viewable bill that shows all charges from all SP sites accessed by the user. Advantageously, the payment information (e.g., credit card number) and other personal information of users are not exposed to the SP sites, and are not transmitted over the distributed network.

46 Claims, 6 Drawing Sheets

PUBLICATIONS

Horizon House Publications Inc., Telecommunications; vol. 28, No. 11; p. 12; ISSN: 0278–4831; "CommerceNet Prefigures Explosion In Business Use Of The Internet"; Maureen Molloy; Nov. 1994 Byte; Cover Story; vol. 19; No. 10; p. 52; Don't Write Off The Internet; Oct. 1994.

InformationWeek; Top Of The Week; p. 12; "Digital Dollars–Microsoft–Intuit Deal Speeds The Day When Most Financial Transactions Will Be Online"; Clinton Wilder with Bruce Caldwell; Oct. 31, 1994.

PC Magazine; vol. 14; No. 4; p. 31; ISSN: 0888–8507; Cybermall Meets Digicash Feb. 21, 1995.

Internet World; "New Deals"; Gary Welz; Jun. 1995.

Network and Internetwork Security Principles and Practice; William Stallings, Ph.D; pp. 314–333; Copyright 1995.

SYSTEM AND METHOD FOR PROVIDING TRUSTED BROKERING SERVICES OVER A DISTRIBUTED NETWORK

BACKGROUND OF THE INVENTION

1. Field of the Invention

This invention relates to computer networks, and more particularly, relates to a system and method for allowing consumers to securely and anonymously make purchases and access online services over an untrusted distributed network such as the Internet.

2. Description of the Related Art

The present invention involves the problem of allowing individual business entities, referred to herein as Service Providers or "SPs," to efficiently and securely sell online services to consumers over a computer network. These online services (also referred to herein as "SP services") may include, for example, downloadable software programs sold by the Service Providers, online publications (e.g., magazines and newspapers) to which consumers subscribe, travel-related services offered by certain Service Providers, or personal finance related services.

The traditional solution to this problem involves the use of a centralized online services network (such as MSN, Compuserve, Prodigy, or America Online) as a "middleman" or broker between the Service Provider and the consumer. Consumers register with these networks (typically by providing a credit card number and other user information), and are then given access to the various SP services available on the particular network. User access to the SP services is typically provided in one of two ways: (1) the SP service content is hosted by (i.e., stored on) the computers of the online services network, or (2) the Service Provider is given a private, direct connection to the online services network so as to make the SP service a part of the same logical network. In either case, consumers are charged by the provider of the online services network for using the SP services (e.g., by a flat fee, or on a per-service or a per-unit-time basis), and a portion of the proceeds are passed along to the Service Providers.

One significant benefit of above-described approach is that the Service Providers need not be concerned with the problems of user authentication and billing, since these matters are typically handled exclusively by the online services network. Additionally, the approach provides for a high degree of protection against the misuse of user information, since the personal and billing information of consumers is normally not exposed to the Service Providers. One significant limitation to this approach, however, is that it does not fully exploit the low cost and wide availability of public, distributed networks, such as the Internet, to connect consumers and Service Providers.

A more recent solution, which exploits the low cost and wide availability of the Internet, has been for Service Providers host their own content as World Wide Web sites ("Web" or "WWW" sites) which can be accessed by consumers "directly" via the Internet. With this approach, the user (consumer) typically registers with each individual Web site from which online services are purchased, and the Service Provider in-turn bills the user directly for the services rendered. Such registration typically involves the transmission of payment and other user information over the Internet to the Web site, and the subsequent assignment of a password and/or account number to the user.

Although this "direct access" approach takes full advantage of the Internet, it does so at the cost of considerable inconvenience and increased security risk to the consumer. For example, the user typically must remember a number of different passwords and/or account numbers (corresponding to the different Web sites), and must separately log onto each Web site from which the user wishes to purchase a service. (This is in contrast to the online services network approach, in which the user performs a single log-on with a single password.) Additionally, because the user must separately register with each Web site, the user's personal and payment information (e.g., credit card number, billing address, phone number, etc.) is unnecessarily exposed to a large number of entities (including both the Service Providers and those who may fraudulently intercept the information as it is transmitted over the Internet), increasing the likelihood of misuse. Further, the direct access approach currently does not allow the user to view a single, centralized bill that shows the charges for all of the SP services rendered.

The direct access approach also has the deficiency of requiring each Service Provider to provide its own security (e.g., user authentication) and billing services. This in-turn requires each Service Provider to implement its own database to store the account information (e.g., passwords, account numbers, credit card numbers, user access rights, charges, etc.) of its subscribers.

What is needed, therefore, is a system and method which allows online services to be sold directly over an untrusted distributed network such as the Internet without the aforementioned problems and inconveniences.

SUMMARY OF THE INVENTION

The present invention provides a system and method in which Service Providers host their own content as directly-accessible sites (referred to herein as "SP sites") on a distributed network such as the Internet, while relying on a centralized Online Broker site (which implements an Online Brokering Service) to handle user-authentication and billing matters. The system advantageously allows users to purchase online services from the SP sites directly, without having to transmit payment information and other personal information over the distributed network, and without having to reveal such information to the Service Providers from which the online services are purchased. In a preferred embodiment the SP sites are in the form of Web sites on the Internet, and the online services available on the Web sites are accessed by the user using a single account (e.g., username and/or password) established between the user and the Online Broker.

The system and method of the invention are advantageously suited for use over a completely untrusted network such as the Internet. In general, however, the system and method can be used on any type of distributed network over which online services are provided by Service Providers to end users, including both trusted and untrusted networks, and including public, private, and hybrid public-private networks.

In accordance with the invention, users (consumers) and Service Providers that wish to make use of the Online Brokering Service initially register with the Brokering Service, and are in-turn provided with the client and server software components needed to make use of the Brokering Service. Upon registration, users provide various account information to the Online Broker, such as payment information (e.g., credit card number), name, address and phone number. This information is maintained in a brokering database at the Online Broker site, and is not exposed to the Service Providers. Each user additionally selects a password, and is assigned a unique ID which can be mapped to the user only by the Online Brokering Service. The password and unique ID are stored in the brokering database, and are used to authenticate registered users.

In operation, when a user connects to a registered SP site and attempts to access an online service, the SP site initiates a challenge-response authentication sequence which allows the Online Brokering Service to authenticate the user for the SP site. In the preferred embodiment, the SP site sends a challenge message to the user's computer over the distributed network (e.g., the Internet), and the user computer responds by generating and returning a cryptographic response message. The cryptographic response message is preferably based on both the challenge message and the user's password (which is entered manually by the user). This response message is essentially meaningless to the SP site, but contains the information needed by the Online Brokering Service to authenticate the user.

The SP site forwards the response message to the Online Broker site along with the user's unique ID (which the SP site obtains from the user computer) and the original challenge message. The Online Brokering Service in-turn accesses the brokering database to determine whether the response message was properly generated, and to thereby authenticate the user. The Online Broker site then sends a message to the SP site indicating whether or not the user was successfully authenticated. Because all three entities (the user computer, the SP site, and the Online Broker site) participate in the authentication process, a high degree of security is achieved.

Upon determining that a user is authentic, the Online Brokering Service preferably sends an anonymous session ID to the SP site to allow the SP site to anonymously bill the user for services subsequently purchased. As the user purchases online services (such as software downloads, accesses to online publications, etc.), the SP site sends billing events to the Online Brokering Service, with each billing event specifying both the anonymous session ID and a charge to be applied to the user's account. The Online Brokering Service in-turn applies such charges to the user's account. Advantageously, the user can later access the Online Brokering site to view an account statement which shows all of the charges from all of the registered SP sites accessed by the user.

The above-described authentication sequence occurs each time the user accesses a different (registered) SP site. With the exception of the manual entry of the password by the user, this authentication sequence is transparent to the user. Advantageously, the client software components on the user's computer temporarily cache the user password once it has been manually entered, allowing the user access one SP site after another without having to reenter the password.

In addition to handling authentication and billing matters, the Online Brokering Service preferably stores user-specific access rights data for the SP sites, and provides the Service Providers with software components for making updates to such access rights data. Upon user authentication, the Online Brokering Service sends to the SP site the user's access rights data which corresponds to the SP site. This data may specify, for example, the particular online publications to which the user has subscribed, or the particular file operations (edit, delete, view-only, etc.) that the user is authorized to perform.

The Online Brokering Service also preferably stores, and dynamically provides to the SP sites upon user authentication, user-specific customization data which may be used by the Service Providers to customize their respective services to individual users. This customization information may include, for example, (1) user-specified preferences for the display of certain types of data, (2) the geographic region (e.g., zip code) in which the user resides, or (3) the configuration of the user's computer. By way of example, the Online Brokering Service may provide the SP sites with information about the connection speeds at which the users connect to the Internet, allowing the Service Provider to appropriately adjust the display resolution and/or the download speed of their services; or, the Online Brokering Service may provide the SP sites with zip codes of users, allowing the services to be tailored to specific geographic regions.

In the preferred embodiment, the system of online services (provided on different Web sites) advantageously appears to the user as a virtual online services network; the user performs a single log-on (using the username and password established with the Online Broker), and then seemlessly accesses one online service after another (on different Web sites) without having to perform a subsequent logon. In addition, the online services are automatically customized to the user's particular access rights and customization preferences. Further, the user can make purchases from the Web sites without ever having to input payment or user information, and can view an account statement which shows all charges from all Web sites.

In addition to taking advantage of the low cost and wide availability of the Internet, the system of the preferred embodiment provides a number of significant advantages over existing methods for purchasing online services over the Internet. From the perspective of the user, one important advantage is that the services are purchased without transmitting payment information (e.g., credit card number) or other personal information over the Internet, and without exposing such information to the Service Providers. Another advantage is that the user is billed by a single billing source (the Online Broker), and can view a single account statement which shows all of the charges from all of the Service Providers. Another advantage is that the user can access the various SP sites and services using a single password and log-on procedure, and can access one SP site after another without having to re-enter the password. Another advantage is that the user is automatically provided with customized services (including customized access rights) at each registered SP site.

The present invention also provides significant advantages to the Service Providers. For example, in contrast to existing systems, the Service Providers do not have to handle user authentication and billing matters, and do not have to implement complex database systems for storing the account information of individual users.

BRIEF DESCRIPTION OF THE DRAWINGS

These and other features and advantages of the invention will now be described with reference to the drawings of certain preferred embodiments, which are intended to illustrate and not to limit the invention, and in which.

DETAILED DESCRIPTION OF THE PREFERRED EMBODIMENTS

1. Overview

Figure 1:
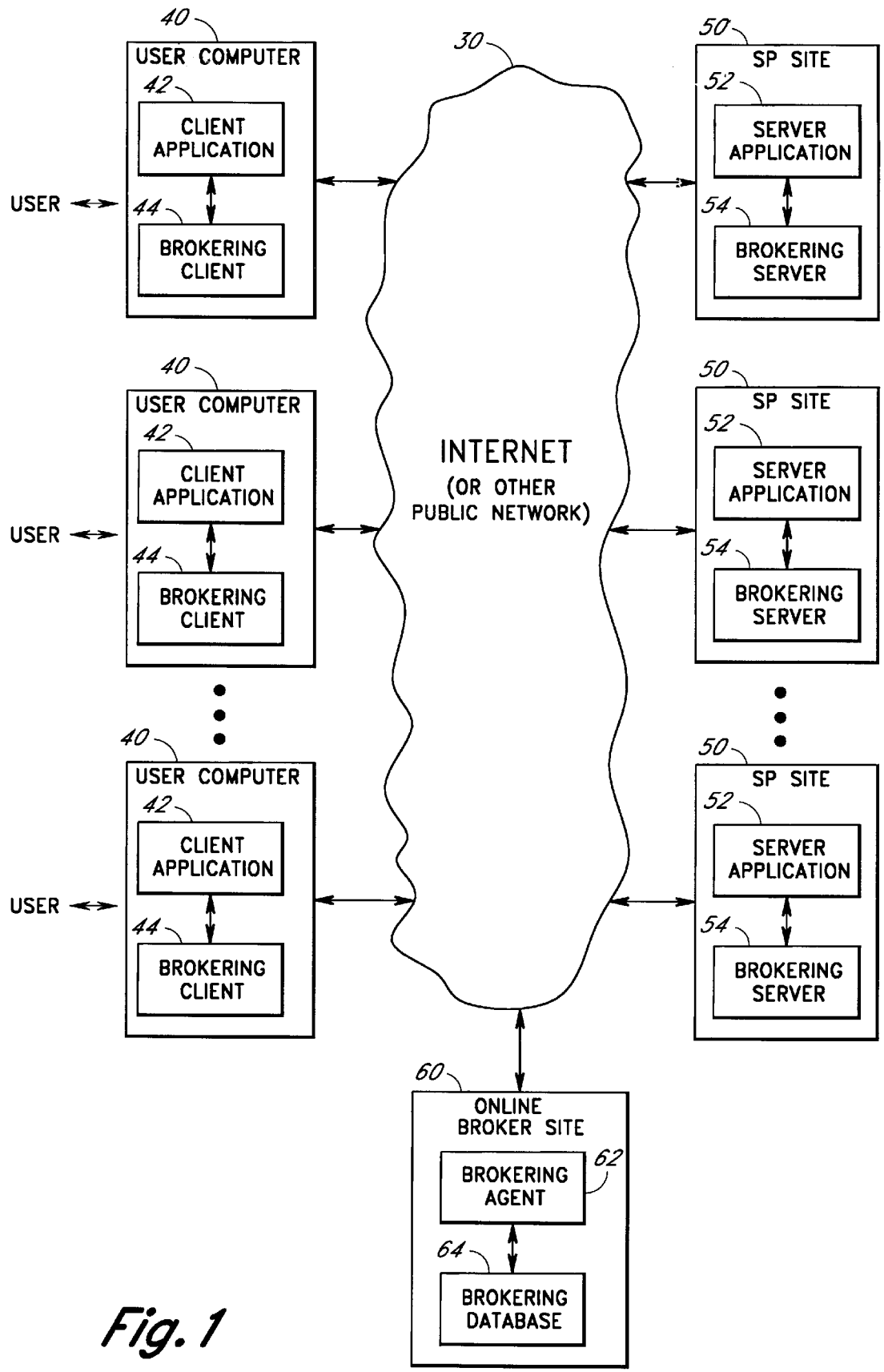
FIG. 1 illustrates the general architecture of a system which operates in accordance with the present invention.

The present invention involves a system and method for enabling consumers to anonymously, securely and conveniently purchase online services from multiple Service Providers (SPs) over a distributed network. The distributed network may be an untrusted public network such as the Internet. In accordance with the invention, a trusted third-party broker provides billing and security services for registered Service Providers via an Online Brokering Service, eliminating the need for the Service Providers to handle such matters. To make use of the Online Brokering Service, users and Service Providers initially register with the Online Broker, and are in-turn provided with the software components needed to make use of the services offered by the broker. These software components, in combination with the Online Brokering Service, preferably provide the following features:

1. A pass-through authentication protocol which allows the registered user to be authenticated by the Online Broker (upon accessing an SP site) while remaining anonymous to the Service Providers and the other entities of the distributed network.
2. A billing system in which the Service Providers send billing events to the Online Broker to allow the broker to generate a centralized bill for each registered user.
3. An online billing viewer which allows each registered user to view a personal statement of all of the charges accrued through access to the various SP sites.
4. An access rights system in which the access rights of individual users with respect to different SP sites are stored by the Online Broker, and are provided dynamically to the SP sites upon user authentication.
5. A service customization feature in which user-specified customization information (such as the user's system configuration, display preferences, geographic region, etc.), is stored by the Online Broker, and is transmitted to individual SP sites upon user authentication (or upon request by the SP sites) to allow the SP sites to provide services that are customized for individual users.
6. A user log-on procedure which allows a registered user to enter a single password at the beginning of an Internet access session (or upon accessing the first registered SP site), and then access one SP site after another without having to re-enter the password.

In addition, the Online Brokering Service may provide an online user directory of the services of registered Service Providers. This allows users to conveniently determine the identities of the Service Providers that have registered with the Online Brokering Service, and reduces the need for the Service Providers to publicly promote their respective on-services.

Prior to using the Online Brokering Service, users and Service Providers, must register with the Online Broker. This involves the following steps:

1. The user registers with the Online Broker by providing various user information (name, address, phone number, etc.) and payment information (credit card number, purchase order instructions, etc.) to the Broker. The user additionally agrees to a contract, and establishes a personal password that is known only by the user and the Broker. Additionally, the Broker assigns a unique ID that can be mapped to the user only by the Broker, and provides the user with the client software components of the system.
2. The Service Provider registers with the Broker by providing various business and payment information, and by entering into a contract with the Broker. The Broker may investigate the Service Provider prior to accepting the registration. The Broker issues a password to the Service Provider, and provides the Service Provider with the server-side software components of the system.
3. The Service Provider establishes a session with the Online Brokering Service. This session is may be established over the same distributed network (e.g., the Internet) on which the SP services are provided to registered users, or may be established over a separate private network or communications channel. As described below, the Service Providers and the Online Broker exchange encrypted messages throughout the session for the purposes of authenticating registered users, obtaining and updating user access rights, transferring user customization information to the SP sites, and recording billing events to user accounts maintained by the Online Broker.

In comparison to existing systems for purchasing online services over the Internet, the present invention provides the following significant advantages:

1. The user purchases services from the Service Providers without transmitting payment information (e.g., credit card number) or other personal information over the Internet.
2. The user's identity and payment information are stored in a single, centralized location, and are not revealed to the Service Providers from which services are purchased.
3. The user is billed by a single source (the Online Broker), and can view a single billing statement which shows all of the charges from all of the Service Providers.
4. The user can access the various SP services using a single password, and can access one SP site after another without having to re-enter the password.
5. Using the access rights data and/or the customization information stored by Online Broker, the Service Providers can provide customized services to the individual users. For example, upon connecting to an SP site which offers online subscriptions to a variety of magazines, the user can automatically be provided with a listing of the magazines that the user has subscribed to, and can be prevented from accessing the other magazines without subscribing.
6. Because the Service Providers rely on the Online Brokering Service to perform user authentication and billing, the Service Providers do not have to perform their own user authentication, and do not have to implement database systems for storing the account information of individual users.

The system and method of the present invention are advantageously suited for use over a completely untrusted public network such as the Internet. (When used in herein in conjunction with "network," the term "public" is intended to imply that user access to the network is not controlled by or limited to a particular business entity or group of business entities. Likewise, term "distributed" implies that processing capabilities and services are spread out among different nodes of the network - as opposed to being centralized within a single host, server or LAN — with different nodes providing different services.) In general, however, the system and method can be used on any type of distributed network over which online services are provided by Service Providers to end users, including both trusted and untrusted networks, and including public, private, and hybrid public-private networks.

To facilitate a complete understanding invention, the remainder of the detailed description is arranged as follows: The basic components and features of the preferred embodiments will be initially be described with reference to FIGS. 1–3 under the headings GENERAL ARCHITECTURE and OPERATION. A specific implementation which makes use of the pre-existing security, sysop tools, accounts database, and billing system components of The Microsoft Network (MSN) will then be described with reference to FIGS. 4–6 under the headings ARCHITECTURE OF MSN-BASED IMPLEMENTATION and OPERATION OF MSN-BASED IMPLEMENTATION.

2. General Architecture (FIG. 1)

FIG. 1 illustrates the basic components of a system which operates in accordance with the present invention. Registered users (also referred to as "consumers") connect to the Internet 30 (or other distributed public network) via user computers 40 to access and purchase SP services available on multiple SP sites 50. The SP sites 50 communicate with an Online Broker 60 to authenticate individual users, record billing events, and (optionally) obtain and update user-specific access rights (an possibly other user information, as described below).

The registered users may connect to the Internet 30 in any known manner. For example, the users may use a suitable online services network to obtain access to the Internet, or may connect by establishing an account with an Internet Service Provider (not shown). Each user computer 40 includes at least one client application 42 (such as a World Wide Web browser) for communicating with server applications on the Internet 30. Each user computer 40 additionally includes a brokering client 44 which receives and generates responses to authentication or "challenge" messages from the SP sites 50.

The SP services are provided on the individual SP sites 50 of registered Service Providers. Each SP site 50 will typically comprise one or more physical servers that are connected to the Internet 30. Each SP site 50 runs at least one server application 52 for providing an online service. A given Service Provider or SP site 50 may, of course, provide many different online services. Some of these services may be generally accessible to the public, while others (primarily those for which a fee is charged) may be made available only to registered users. For purposes of the following description, it may be assumed that the term "SP service" refers only to the on-services that require user registration. Additionally, it may be assumed that the terms "user" and "Service Provider" refer only to registered users and Service Providers.

Although the user computers 30 and the SP sites 50 are shown as being connected directly to the Internet 30, it will be understood that such connection may be via one or more private networks. For example, a user computer 30 may connect to the Internet 30 via a private cable television network using a cable modem, and an SP site may connect to the Internet via a private network of the Service Provider's organization.

Various types of SP services may be offered by the Service Providers. For example, one Service Provider may provide a personalized investment portfolio service, while another Service Provider may provide an bulletin board system (BBS) for allowing users exchange information on pre-selected topics. Other SP services may include, for example, software download services, investment advice services, communications (e.g., email and Internet telephone) services, and access to online versions of selected printed publications. As user access speeds to the Internet increase, it is expected that the SP services will include high bandwidth services such as interactive games and downloads of movies, television shows and hi-fi audio.

The Service Providers are free to select any appropriate method for charging users for the online services rendered. For example, users may be charged in proportion to the amount of time spent on a given service, or, in the case of a magazine subscription or software download, may be charged a one time fee.

With further reference to FIG. 1, each SP site additionally includes brokering server components 54. The brokering server components 54 are preferably in the form of software modules which include the necessary logic for implementing the passthrough authentication protocol, and for forwarding billing events (generated by the server application) to the Online Broker. The brokering server components 54, may additionally include logic for updating and processing access rights data stored by the Online Broker.

The Online Brokering site 60 preferably comprises one or more physical servers that run a Brokering Agent application 62 to implement the Online Brokering Service. The site 60 is preferably operated by a single business, or a small collection of businesses, that is qualified to handle billing and security matters on behalf of the Service Providers. As described below, the Broker site 60 may communicate with the SP sites 50 (to handle authentication requests and billing events) either via the Internet (or other public network), a private network, a private communications channel, or a combination thereof.

Although a single Online Broker site 60 is shown in FIG. 1, it will recognized that multiple Online Broker sites could be provided on the Internet 30. For example, Online Broker sites could be set up at several different geographic locations to accommodate SP sites 50 located in different regions. Additionally, as with the user computers 40 and SP sites 50, the Online Broker site 60 may be connected to the Internet 30 via one or more private networks.

The Online Broker site 60 includes one or more databases 64 for storing various account information with respect to the users and Service Providers. This information preferably includes the passwords, unique IDs, access rights and bills (charges) of the users, and includes the passwords that have been assigned to the Service Providers. As noted above, the Broker site 60 may also store and provide access to a directory of the services available from the Service Providers, to help users locate such services.

Finally, the brokering site 60 may store, and make available to the service Providers, certain user-specific customization information that can be used by the Service Providers to tailor their respective services to individual users. This information may include, for example, the user's preferences with respect to the display of certain types of media, the geographic region (e.g., zip code) at which the user resides, the line speed (baud rate) at which the individual user connects to the Internet, or a description of the user computer 40. Such information may be specified by the user upon registration with the Online Broker, and/or may be interactively specified or updated by the user via a connection between the user computer and Online Broker site 60.

The customization information may be provided to the Service Providers (by the Online Broker) either automatically upon user authentication (along with the user's access rights information), or in response to queries from the Service Providers. The Service Providers can use this information customize their respective online services to individual users. For example, an SP site may use the customization information to provide the requested service to the user at a baud rate which is commensurate with the user's connection speed, or may adjust the resolution of graphics (or video) images to match the system characteristics (monitor resolution, connection speed, etc.) of the user computer 40. As will be recognized by those skilled in the art, many different types of customization information can be stored by the Online Broker 60.

3. Operation (FIGS. 2 and 3)

Figure 2:
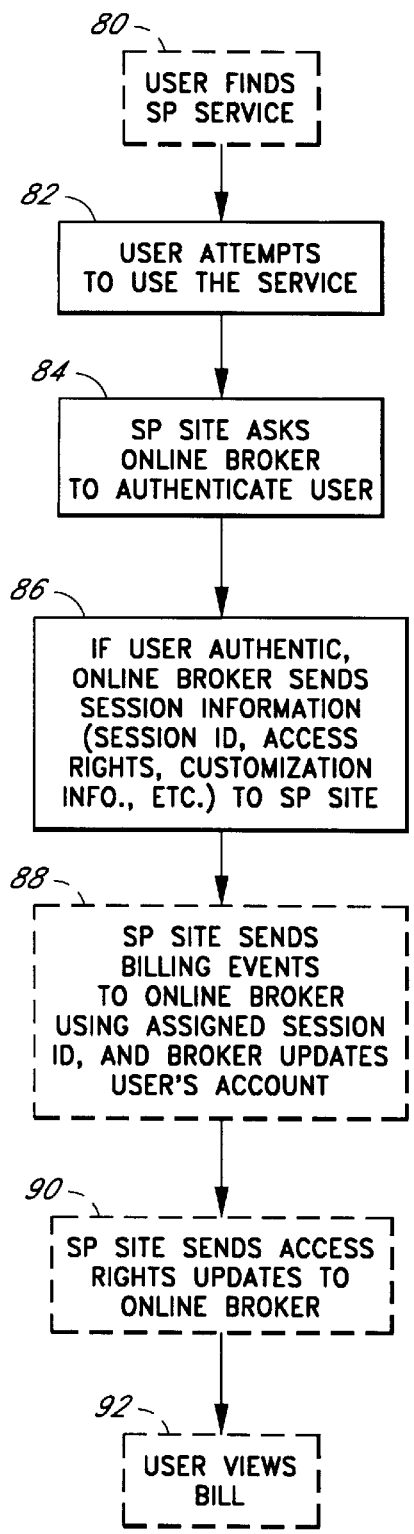
FIG. 2 Illustrates the steps performed when a registered user accesses a online service of a registered Service Provider site. Boxes shown in dashed lines in FIG. 2 illustrates steps which may or may not be performed, depending upon the particular actions of the user.
Figure 3:
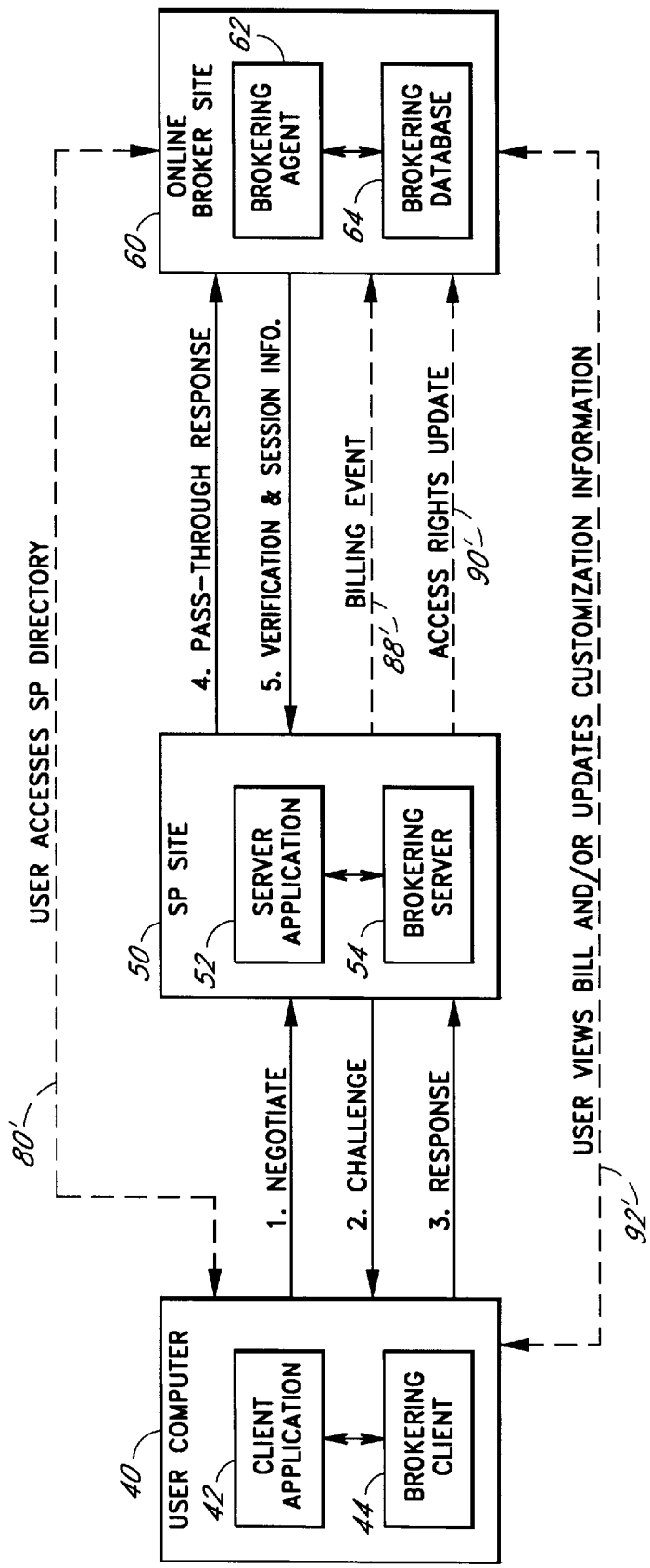
FIG. 3 illustrates the communications which take place between a user computer, Service Provider (SP) site, and an Online Broker site in accordance with the present invention, with the solid arrows (numbered 1–5) illustrating messages that are exchange as part an authentication sequence.

FIGS. 2 and 3 illustrate the basic steps that take place, in accordance with the invention, when a registered user accesses an SP site 50 and uses a service. In FIG. 2, the boxes shown in dashed lines represent optional steps, which may or may not be performed (depending upon the particular actions taken by the user.) In FIG. 3, the solid arrows between the user computer 40, SP site 50 and the Online Broker site 60 represent messages transmitted over the Internet 30 as part of an authentication sequence, with the numbers 1–5 indicating the order in which these messages are passed. The dashed arrows in FIG. 3 represent optional exchanges of information which are separate from the messages of the authentication sequence.

With reference to block 80 in FIG. 2, the user initially locates the SP service by obtaining the location information of the corresponding SP site 50. This location information may be in a variety of forms, such as a Uniform Resource Locator (URL), a Domain Name Service (DNS) name, or an Internet Protocol (IP) address. As illustrated by the corresponding dashed line 80' in FIG. 3, the user may optionally obtain this information using an online SP service directory provided by the Online Broker 60. Of course, the user may already have this information from a previous log-on session, or may obtain the information using another Internet directory service.

With reference to block 82, the user then attempts to use the SP service. As illustrated in FIG. 3, this involves the transmission of a "negotiate" message from the user's computer 40 to the SP site 50. This negotiate message includes the user's unique ID, which may be in the form of a unique username. (The user ID is preferably provided in the negotiate message in a masked form to prevent exposure to the Service Provider.) The brokering server software 54 on the SP site 50 responds to the negotiate message by sending a pseudo-random "challenge" message to the user computer 40.

In response to the challenge message, the brokering client 44 generates and returns a cryptographic "response" message, which is based on both the challenge message and the user's password. In the preferred embodiment, the response message is generated by combining the challenge message with the user's password in a predetermined manner (e.g., by interleaving the bits of the password with the bits of the challenge message), and then using a conventional one-way (i.e., non-reversible) hash algorithm such as MD4 (Message-Digest 4), to convert the challenge/password combination into a hash code. (For a description of the MD4 algorithm, see Rivest, R., "The MD4 Message Digest Algorithm," *Proceedings, Crypto '90*, Springer-Verlag, Aug. 1990. For a description of other cryptographic algorithms which may be used, see Stallings, W., *Network and Internetwork Security*, Prentice Hall, 1995.) Because the response message is generated using a one-way hash algorithm, the Service Provider cannot extract the user's password (or any other meaningful information) from the response message. Although a one-way hash algorithm is preferred, it will be recognized that other types of cryptographic algorithms can be used to generate the response message, including public key and private key encryption algorithms.

In order to generate the response message in the manner described above, the brokering client 44 must initially obtain the user's password. If the user has not recently accessed another SP site (e.g., during the last 20 minutes, or during the same Internet access session), the brokering client 44 obtains the password by prompting the user. If, on the other hand, the user has recently entered the password (e.g., upon accessing a previous SP site), the brokering client 44 re-uses the previously entered password, without prompting the user. This feature of the brokering client advantageously allows the user to access one SP site after another without having to re-enter the password.

The above-described method of requesting authentication is commonly referred to as a "challenge-response authentication" protocol. In the preferred embodiment, the particular protocol used is a variation of the NT Challenge-Response Authentication protocol (varied to permit pass-through verification, as described below), which is used by the Microsoft Windows NT operating system. This protocol, and other types of challenge-response authentication protocols which may be used, are described in Kaufman, Perlman and Speciner, *Network Security: Private Communication in a Public World*, Prentice Hall, 1995. Because all three entities (the user computer, the SP site, and the Online Broker site) participate in the authentication process with this type of protocol, a high degree of security is achieved.

With reference to block 84, once the response message has been received at the SP site 50, the Service Provider effectively asks the Online Broker to authenticate the user. This is done by sending an encrypted pass-through message (which includes the response message, the challenge message from which the response message was generated, and the user's unique ID) to the Online Broker site 60 for authentication, as illustrated in FIG. 3. To authenticate the user, the Online Broker site 50 initially accesses the brokering database 64 with the user's unique ID to look up the user's password. The Brokering Agent 62 then determines whether the received response message corresponds to the user's password and the received challenge message, to thereby authenticate the response message (and thus the user). This is done by generating the "correct" response from the password and the received challenge message (using the same one-way hash algorithm used by the user computer 40), and then comparing the correct response message to the received response message. If the two response messages match, the user is deemed to be authentic. Finally, the Online Broker site 60 returns a message to the SP site 50 to indicate whether or not the user was successfully authenticated.

This method of authentication is generally known as "pass-through" authentication, since the information needed to authenticate the user is passed-through to the entity capable of performing the authentication. Pass through authentication is commonly used within corporate networks, but is not commonly used on public networks such as the Internet. Although pass-through authentication is preferred, other authentication methods which generally conceal the user's identity and payment information from the Service Provider can be used. For example, the response message (generated by the user's computer 40) could be passed "directly" (i.e., by a path that does not include the SP site 50) to the Online Broker site 60 for verification. If the user is not successfully authenticated by the Online Brokering Service, the SP site 50 may send an error message to the user.

With reference to block 86, if the user is successfully authenticated, the Brokering Agent 62 retrieves from its databases 64 the user's access rights, if any, with respect to the SP site 50 which requested the authentication. These access rights may indicate, for example, the specific SP services that the user has subscribed to, and/or the actions that can be performed by the user (e.g., download, edit file, read-only access, etc.) upon accessing certain services. The Brokering Agent 62 may additionally retrieve other user-specific information, such as the user's display preferences or geographic region, that may be used by the SP site 50 to tailor its services to the particular user. The Online Broker site 60 returns this information to the SP site 50 (using a suitable encryption technique) as part of a verification message. This verification message additionally includes a unique but anonymous session ID which allows the Service Provider to bill the user for the services purchased. (The session ID, access rights data, and other user-specific information returned by the Online Broker site 60 are referred to generally as "session information.") The user is then permitted by the SP site 50 to access the requested service.

With further reference to FIG. 3, the client and server applications 42, 52, are preferably configured such that the challenge message (generated by the brokering server 54) and the response message (generated by the brokering client 44) are integrated within the application-level-protocol message stream between the client and server applications 42, 52. For example, if the client and server applications 42, 52 use HTTP (the Hyper Text Transfer Protocol) as the application level protocol, the applications 42, 52 are written (or modified, if such applications already exist) to integrate the negotiate, challenge and response messages with the HTTP message stream.

During the course of the service session between the user and the SP site 50, the user may request to purchase a service for which a fee is charged by the Service Provider. For example, the user may request a download of a software program sold by the Service Provider. This request may be in the form of a message from the client application 42 to the server application 52, and may be independent of the brokering software. If such a request is received by the SP site 50, the SP site uses the anonymous session ID assigned in step 86 to ask the Online Broker 60 to bill the user for a specified amount (by sending a billing event message to the Online Broker site 60), and the Online Broker site 60 in-turn updates its databases 64 to charge the user's account. This process of charging the user is illustrated by block 88 of FIG. 2, and by the corresponding arrow 88' in FIG. 3. The billing event message will normally include a user-readable description of the charge, which may be viewed by the user upon reviewing the online bill. Of course, the SP site 50 may send multiple billing events to the Online Broker site 60 during the course of a service session.

With reference to block 90 of FIG. 2, and the corresponding arrow 90' of FIG. 3, the SP site 50 may also send requests to the Broker site 60 to update the user's access rights. The SP site 50 may send such an update request, for example, if the user purchases (or cancels) a subscription to an online publication. On the following request by the SP site 50 to authenticate the user, this update to the user's access rights will be reflected in the session information provided to the SP site 50, and the SP site 50 can automatically provide the user with the appropriate access privileges.

Although the maintenance of user access rights data by the Online Broker site 60 advantageously provides for a high degree of user anonymity, it will be recognized that some or all of the access rights data could alternatively be stored by the SP sites 50.

When the user terminates the connection to the current SP site 50 and connects to a different SP site, the sequence of steps of blocks 80–90 of FIG. 2 (and the corresponding messages shown in FIG. 3) are be repeated. As indicated above, the user will not, however, be prompted for the password, since the brokering client 44 transparently caches and re-uses the password. (For security purposes, the brokering client 44 is preferably configured to "forget" the password when the user disconnects from the Internet, and when the user fails to connect to a new ST site within a predetermined period of time.) Thus, from the perspective of the user, the user is presented with a single log-on procedure, and is then presented with a series of online services that are customized to the user's preferences and access privileges. In this respect, the user sees what may be thought of as a virtual online services network.

With further reference to FIGS. 2 and 3, the user may, at any time, access the Online Broker site 60 to view a user-specific bill and/or to update the user-specific information (if any) stored by Online Brokering Service. This may be done using special components of the brokering client software 44. Advantageously, the bill shows all of the charges from all of the SP sites accessed by the user.

With further reference to FIG. 3, all of the messages passed between the user computer 40 and the SP site 50 are preferably transferred over the Internet (or over the particular distributed network in which the system is employed). In addition, once the user has been authenticated, the subsequent communications (not shown) between the client and server applications 42, 52 take place over the Internet. Thus, the system advantageously allows the users and the Service Providers to take advantage of the low cost and wide availability of the Internet, while providing features heretofore available only on trusted online services networks.

With respect to the messages passed between the SP site 50 and the Online Broker site 60, it is envisioned that the communications method will depend upon the particular Service Provider. For example, a Service Provider which conducts a relatively small amount of business on the Internet may prefer to communicate with the Online Broker 60 exclusively over the Internet, while a company that conducts a relatively large amount of business may prefer to set up a private, secure communications channel (to provide for greater security and possibly the faster exchange of messages) between SP site 50 and the Online Broker site 60. Other Service Providers may choose to communicate with the Online Broker site 60 via a private network.

4. Architecture of MSN-Based Implementation (FIG. 4)

A specific implementation in which the Online Broker site 60 resides entirely within MSN, and in which the SP site 50 is a Microsoft Windows NT based system, will now be described with reference to FIG. 4. This implementation makes extensive use of components that currently exist within MSN, including the MSN billing system and database 64A (hereinafter the "MSN billing system"), the MSN accounts database 64B, and the MSN security system and database 64C (hereinafter the "MSN security system"). The implementation also makes use of client components (described below) currently being used by MSN subscribers to access MSN. As described below, this MSN-based implementation will allow non-MSN subscribers (as well as regular MSN subscribers) to use an Online Brokering Service of MSN to purchase services over the Internet from independent Service Providers.

Figure 4:
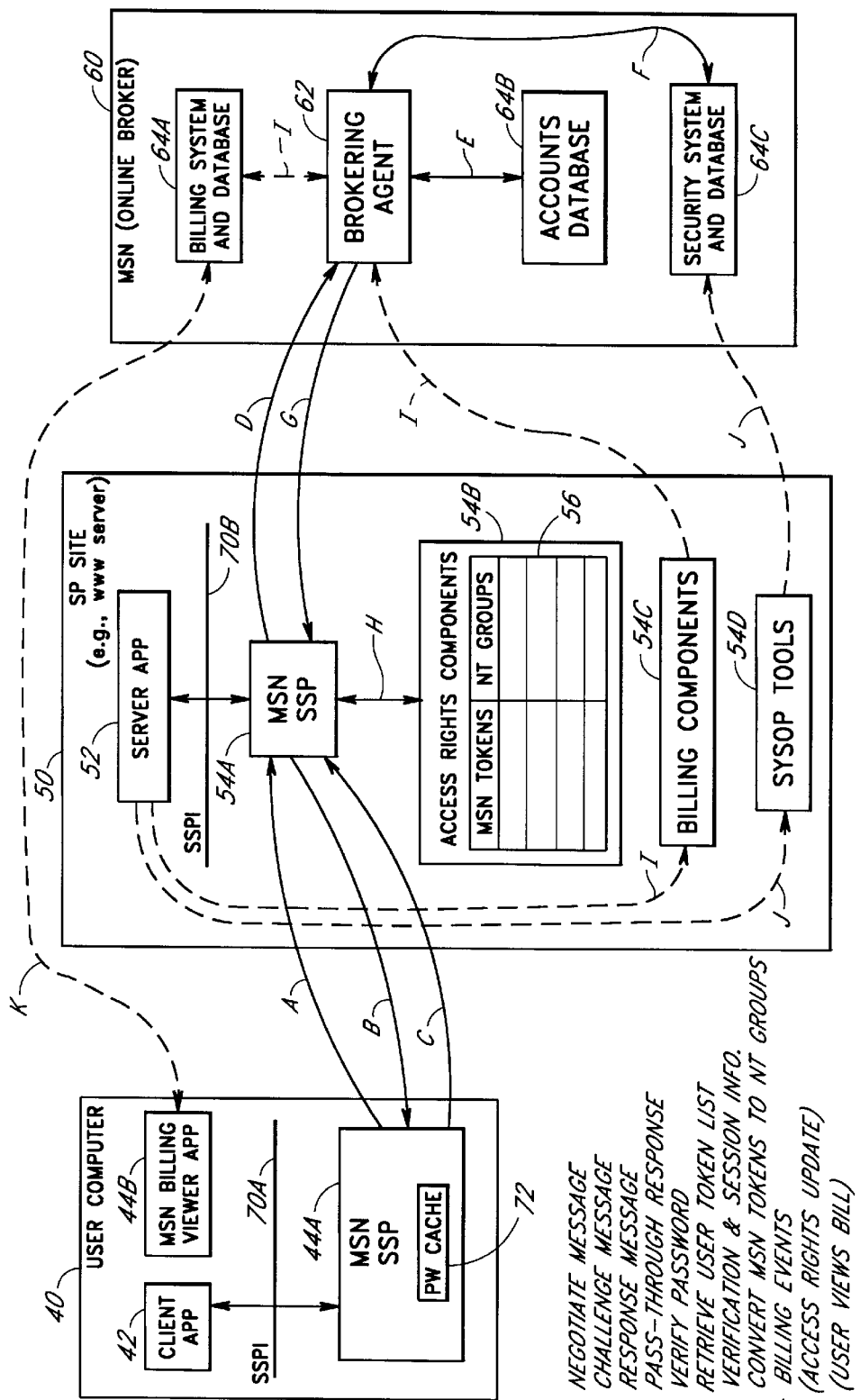
FIG. 4 illustrates the architecture of a preferred implementation which makes use of existing componets of The Microsoft Network (MSN).

In FIG. 4, the reference numbers of the previous figures are re-used (with an appended character where appropriate) to indicate a correspondence between components. For example, the components labeled 44A and 44B in FIG. 4 correspond to the brokering client software 44 of FIGS. 1 and 3.

With reference to FIG. 4, the user computer 40 includes a client application 42 which makes calls to a client-side MSN Security Support Provider (MSN SSP) package 44A via the Microsoft Security Support Provider Interface (SSPI) 70A. Likewise, the SP site 50 includes at least one server application 52 which communicates with a server version 54A of the MSN SSP package via a server-side version 70B of the Microsoft SSPI. The client and server components 44A, 54A, 70A and 70B of the MSN SSP package and the Microsoft SSPI are available from Microsoft Corporation. Additionally, the client components 44A, 70A of the MSN SSP package and the Microsoft SSPI and are currently being shipped with the Microsoft Windows 95 operating system.

The MSN SSP package 44A, 54A is a set client-side and server-side dynamic link libraries (DLLs) which implement the Windows NT challenge-response protocol, as customized for use with MSN. The MSN SSP package is derived from the Microsoft Windows NT SSP, which implements the NT challenge-response protocol on networks that use the Microsoft Windows NT operating system. Unlike NT SSP, which forwards "response" messages to a domain controller for authentication, MSN SSP is configured to pass the response messages (via the SP site) to a Brokering Agent 62 of MSN.

The SSPI 70A, 70B is a standard interface which isolates applications (such as the client and server applications 42, 52) from the underlying details of the MSN SSP package, allowing applications to be written without regard to the type of security protocol used. The SSPI interface 70A is used by the Microsoft Windows NT operating system, and is documented, for example, in the help file of the Windows 32-bit Software Development Kit (Win32 SDK), available from Microsoft Corporation. Throughout the following description, the names of specific application program interfaces (APIs) of the Microsoft SSPI are italicized.

With further reference to FIG. 4, the user computer 40 also includes an MSN billing viewer application 44B for viewing a user-specific bill maintained within the MSN billing system 64A. This application is currently being shipped with the Microsoft Windows 95 operating system, and is used by MSN subscribers to view their respective billing statements on MSN. It is anticipated that this application will be modified to allow non-MSN subscribers (i.e., registered users who use MSN solely as an Online Broker) to access their brokering bills via the Internet.

The server site 50 site additionally includes a set of access rights components 54B. The access rights components 54B include a table 56 which maps MSN security tokens to corresponding NT groups on a one-to-one basis. (As described below, MSN tokens are numerical content identifiers that are used within MSN for efficiently storing access rights data, and NT groups are security entities used by the Microsoft Windows NT operating system.) This table 56, which is stored in the Windows NT registry, will be created by the Service Provider (assuming that the Service Provider wants to use native Windows NT access control using Access Control Lists), and will be used to convert user-specific access rights data stored within the MSN security system 64C to the Windows NT format recognized by the server application 52. The access rights components 54B also include a set of APIs for accessing and updating the table 56, including APIs that can be used by the Service Providers to manipulate table entries.

Although the preferred implementation depicted by FIG. 4 assumes that the server application 52 is a Microsoft Windows NT based application, the access rights components 54B can be adapted to convert MSN tokens to the security formats used by other platforms. For example, the access rights components 54B could be modified to covert MSN tokens to a security format recognized by UNIX. The server site 50 site also includes a set of billing components 54C for allowing the Service Provider to forward billing events to MSN 60. The billing components 54C are in the form of a set of APIs that can be called by the server application 52. These APIs are published to the Service Providers to permit the writing of server applications 52 which make use of the MSN billing system 64A. The billing events generated by calls to the billing components 54C are added to an active billing log file (not shown) at the SP site 50. This log file is periodically passed to a Brokering Agent package 62 (described below) within MSN, which forwards the billing events to the MSN billing system 64A.

The server site 50 additionally includes a Sysop Tools application 54D. This application includes a set of APIs which can be called by the server application 52 to make updates to the relevant access rights data (described below) stored within the database of the MSN security system 64C. These APIs act as a client (or "front end") to the security code of the MSN security system 64C. A preferred implementation of the Sysop Tools application 64C is described in detail in co-pending U.S. application Ser. No. 08/516,576 of the title SYSTEM AND METHOD FOR EDITING CONTENT IN AN ON-LINE NETWORK, filed Aug. 18, 1995, which is incorporated herein by reference. A preferred implementation of the MSN security system and database 64C is described in detail in co-pending U.S. application Ser. No. 08/516,573 of the title SYSTEM FOR CONTROLLING USER ACCESS, filed Aug. 18, 1995, which is also incorporated herein by reference.

With further reference to FIG. 4, the Online Brokering Service within MSN consists primarily of the Brokering Agent 62 (also referred to as the "authentication agent"), the MSN billing system 64A, the accounts database 64B, and the MSN security system 64C. The Brokering Agent 62 consists of a collection of DLLs which run on one or more physical servers (not shown) of the MSN data center, and which interact with the brokering database components 64A-C of MSN. (As described in the above-referenced patent applications, MSN comprises a data center in which services are distributed across physical servers of one or more local area networks, with different groups of servers running different service applications. Access to the MSN network can be obtained, via a series of gateway computers of the data center, either by a set of direct dial telephone numbers provided by Microsoft, or by the Internet.)

The primary function of the Brokering Agent 62 is to receive, process and respond to authentication requests from the various SP sites 50. The Brokering Agent 62 also receives billing events from the SP sites 50, and passes these billing events to the MSN billing system 64A for processing. The Brokering Agent 62 monitors a socket using TCP/IP, and is protected by MSN's firewall.

The MSN billing system 64A is a highly scalable client-server type database system which resides on a group of physical billing servers (not shown) within the MSN data center. Customers of the system are advantageously billed in their own respective currencies, and are provided with online account statements that can be viewed using the MSN billing viewer application 44B. The MSN billing system 64A is further described in co-pending U.S. application Ser. No. 08/518,253 of tile title BILLING SYSTEM FOR A NETWORK, filed Aug. 23, 1995, which is incorporated herein by reference. As described above, a set of client-side APIs are provided to the Service Providers, in accordance with the present invention, to permit billing events to be passed to the MSN billing system 64A. The Service Providers are also provided with documentation on proper billing formats.

The accounts database 64B is a scalable database system for storing various user account information for both MSN subscribers and registered users of the Online Brokering Service. The Brokering Agent 62 accesses the accounts database 64B to authenticate users in response to authentication requests from the various SP sites 50. The information stored for each user in the accounts database 64B includes, for example, the user's password, the user's unique ID (assigned upon registration), the user's account plan (specifying, for example, whether or not the user is an MSN subscriber), the user's name and address, and the optional user-specific customization information (described above) which is dynamically provided to the SP sites 50 (upon user authentication) to permit the customization of SP services.

The MSN security system 64C stores the access rights of individual MSN subscribers and, in accordance with the present invention, additionally stores the access rights of registered users of the Online Brokering Service. These access rights of the registered users specify the actions that can be performed by the users at the various SP sites 50. Access rights data is stored within the MSN security system 64C using security tokens (or simply "tokens"), which are unique numerical (32-bit) identifiers of the various "content categories" (also referred to as "service areas") for which user-specific access rights may be specified. For example, one token may represent all MSN public data (viewable by all MSN subscribers), while another may represent all "sysop only" data (viewable only by MSN system administrators), while another token may represent a pay service or service area of MSN for which user subscription is required. In accordance with the invention, tokens are assigned to the Service Providers upon registration with the Online Brokering Service, allowing the Service Providers to assign user-specific access rights to their respective SP services and service areas. The assignment of tokens to Service Provide is further described below.

Figure 5:
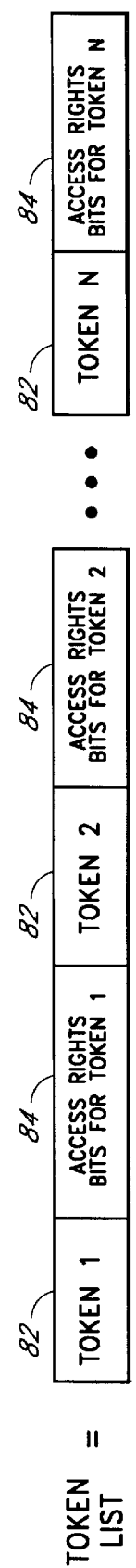
FIG. 5 illustrates a preferred format in which user access rights data is stored and provided to SP sites in the system of FIG. 4.

Upon being queried (by the Brokering Agent 62 or some other entity within MSN) with a user's unique ID, the MSN security system 64C returns a user-specific "token list" which fully specifies all of the access rights of the MSN subscriber and/or registered user. (The manner in which the token lists are preferably stored within the database of the MSN security system 64C, and the process by which the token lists are retrieved, are described in detail in the above-referenced patent application of the title SYSTEM FOR CONTROLLING USER ACCESS.) With reference to FIG. 5, the token list 80 contains a set of tokens 82 together with a set of access rights bits 84 for each such token. The tokens 82 within the token list 80 indicate the service areas to which the user has at least some access rights. Thus, if a given token does not appear in the user's token list, the user cannot access the corresponding service area.

The access rights bits 84 associated with a given token 82 specify the user's particular access rights within the service area identified by the token. These access rights are in the form of privilege levels such as "viewer," "user," "host," "sysop," and "supersysop," with each access rights bit corresponding to a particular privilege level. These privilege levels are converted into specific access capabilities (such as read-only access, read/write access, read/write/delete access, etc.) by the service applications. This advantageously allows writers of MSN service applications to flexibly define the types of access capabilities to be given to different users, rather then being restricted to a pre-defined set of access capabilities.

In accordance with the invention, upon registration with the Online Brokering Service, each Service Provider is assigned at least one token which uniquely corresponds to the SP service or services of the Service Provider. In addition, the SP is given sysop privileges (via an MSN user account) with respect to these tokens This enables the SP to remotely make updates to the access rights stored with respect to these tokens using the Sysop Tools package 54D, as described in the above-referenced application of the title SYSTEM AND METHOD FOR EDITING CONTENT IN AN ON-LINE NETWORK.

To provide a specific example, a Service Provider that provides subscriptions to online magazines may be assigned 50 tokens, and each such token may inturn be assigned by the Service Provider to a particular magazine (or set of magazines) to which the Service Provider wishes to separately control user access. The service Provider would also be given sysop privileges with respect to the 50 tokens. Using the Sysop Tools package 54D (FIG. 4), the Service Provider can then update the respective token lists of the various users of the SP site 50, to thereby modify the users' access rights with respect to the different magazines.

Although it is believed that the access rights feature of the invention will be extremely useful to most Service Providers (since the Service Providers normally cannot store the access rights data themselves, because of user anonymity), it is contemplated that some Service Providers will have little or no use for the feature.

Figure 6:
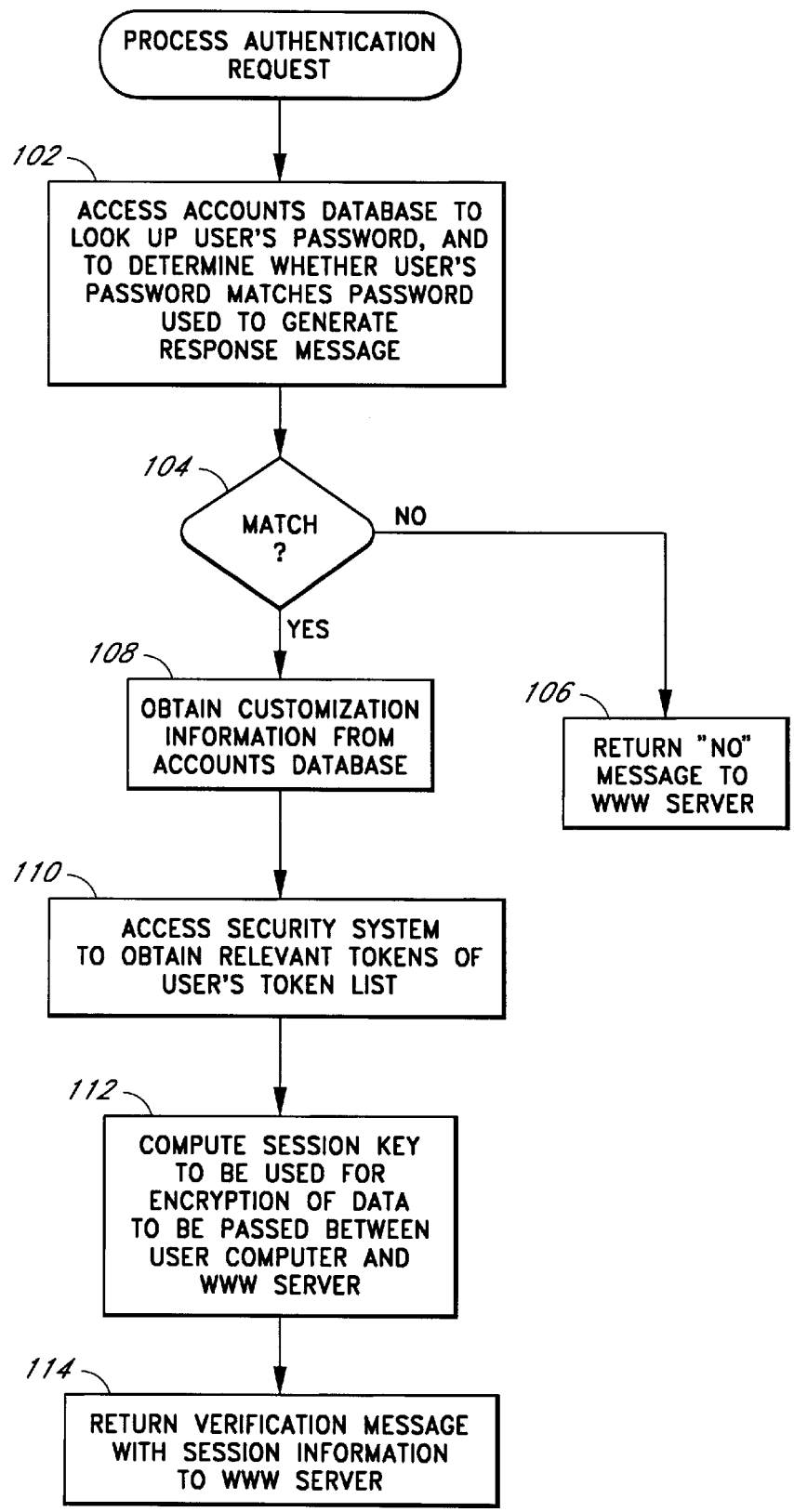
FIG. 6 illustrates the steps that are performed by the Brokering Agent of FIG. 4 in response to an authentication request from an SP site.

5. Operation of MSN-Based Implementation (FIGS. 4 and 6)

The operation of the MSN-based implementation will now be described with reference to FIG. 4, which illustrates the interactions between the system components once a socket connection has been established between the user computer 40 and the SP site 50, and with reference to FIG. 6, which illustrates the steps performed by the Brokering Agent 62 in response to an authentication request. In this operational description, it is assumed that the SP site 50 is in the form of a World Wide Web (WWW) server. Additionally, it is assumed that the server application 52 is a Microsoft Windows NT based application which uses HTTP to communicate with the client application 42.

In FIG. 4, the arrows shown in solid lines represent communications which occur as part of the authentication sequence, with the letters A-H indicating a preferred order in which these communications occur. The arrows shown in dashed lines represent communications which do not occur as part of the authentication sequence.

With reference to FIG. 4, messages A, B, and C are passed between the user computer 40 and the SP site 50 (over the Internet) as part of the above-described negotiate-challenge-response sequence. Although these messages are conceptually passed directly between the client and server MSN SSP packages 44A, 54A, it will be understood that these messages are actually integrated with the HTTP message stream between the client and server applications 42, 52.

Prior to the negotiate-challenge-response sequence, the client application 42 establishes a sockets layer communications session with the WWW server 50. The negotiate message is then generated by the client-side MSN SSP package 44A in response to an InitializeSecurityContext API call from the client application 42, and the client application 42 in-turn passes the negotiate message to the server application 52. In the preferred embodiment, the unique ID of the user (which may be in the form of a username) is included within the negotiate message. In other embodiments, the user's unique ID may be transmitted to the SP site with the response message. In response to the negotiate message, the server application 52 calls an AcceptSecurityContext API of the server-side SSPI 70B. This API call returns the challenge message, which is passed to the client application 42 over the Internet.

The client application 42 passes the challenge message to the MSN SSP package 44A via the InitializeSecurityContext API. In response to this API call, the MSN SSP package 44A generates and returns the response message, and computes a session key which may be used for the subsequent encryption of data between the client and server applications 42, 52. (It is envisioned that the session key will be used for encryption primarily by custom applications 42, 52, and that other applications will instead use standard encryption protocols such as the Secure Sockets Layer protocol or the Private Communications Technology protocol.) The response message is preferably generated from the user's password and the challenge message, in the same manner described above with reference to FIGS. 1 and 2. To obtain the user's password, the MSN SSP package 44A initially checks its password cache 72, and if no password is found, prompts the user for the password. The response message is then passed over the Internet to the server application 52, and the server application calls the AcceptSecurityContext API with the response message.

The call to AcceptSecurityContext returns an encrypted pass-through message which is forwarded to the Brokering Agent 62 over the Internet. (As indicated above, this pass-through message, and the subsequent response from the Brokering Agent 62, may alternatively be exchanged over a private network or communications channel.) This pass-through message, which serves as an authentication request from the WWW server 50, includes the original challenge message, the resulting response message, and the unique ID of the user.

FIG. 6 illustrates the primary steps that are performed by the Brokering Agent 62 in response to the authentication request. With reference to blocks 102–106 of FIG. 6, and the arrow labeled "E" in FIG. 4, the Brokering Agent 62 initially uses the unique ID to look up the user's password from the accounts database 64B. The Brokering Agent 62 then determines whether the response message was properly generated from the challenge message and the user's password. If not, the brokering a agent 62 returns an encrypted "NO" message to the WWW server, indicating that the authentication was unsuccessful.

With reference to blocks 108 and 110, if the Brokering Agent determines that the response message was properly generated, and is thus (presumably) authentic, the Brokering Agent 62 accesses the accounts database 64B to obtain the user-specific customization information (e.g., display preferences, connection speed, geographic region, etc.), if any, to be provided to the WWW site 50 with the subsequent verification message. In addition, the Brokering Agent 62 queries the MSN security system (as indicated by arrow "F" in FIG. 4) for the user's access rights with respect to the WWW site 50. This effectively involves a two-step process: First, the user's token list is obtained from the security database. This token list may include tokens (and corresponding access right data) which correspond to other service areas, such as internal MSN service areas and/or service areas of other SP sites 50. Second, the token list is filtered by retaining only those tokens to which the particular Service Provider making the authentication request has sysop privileges. The result is a filtered token list which specifies the user's access rights only with respect to the particular WWW server 50.

As indicated above, the steps corresponding to blocks 108 and 110 represent optional features which need not be used by the Service Providers. Accordingly, it is contemplated that the pass-through message will include a field for allowing the WWW server 50 to specify (1) the customization data to be returned, if any, and (2) whether the user's access rights should be returned.

With reference to block 112 of FIG. 6, the Brokering Agent 62 also computes a session key to be provided to the WWW server 50 for the subsequent encryption of data between the client and server applications 42, 52. This session key is generated using the same method used by the user computer 40 to generate the session key. The two session keys will thus be identical.

Finally, with reference to block 114 of FIG. 6 (and the arrow labeled "G" in FIG. 4), the Brokering Agent 62 returns an encrypted verification message to the WWW server 50. This verification message indicates that the authentication was successful, and includes the "session information" obtained in the steps of blocks; 108–112 of FIG. 6. As noted above, the verification message also includes a unique but anonymous session ID to be used by the WWW server 50 for generating billing events.

With reference to arrow "H" in FIG. 4, upon receiving the verification message, the server-side MSN SSP package 54A uses the access rights components 54B to convert the filtered token list returned by the Online Broker 60 to a corresponding list of NT groups to which the user belongs, and then looks up the SIDs (security IDs) which correspond to the NT groups. (In other embodiments, the server application 52 may be written to accept MSN tokens, in which case conversion to NT groups will be unnecessary.) The MSN SSP package 54A thereby converts the MSN access rights information to a format which is meaningful within the Microsoft Windows NT environment of the WWW server 50.

The MSN SSP package 54A thereafter uses a dummy account to impersonate the user on the WWW server 50 in the user's security context, to thereby provide user access consistent with the user's particular access rights. This is accomplished as follows: Initially, the MSN SSP package 54A calls the LsaLogonUser system function of Windows NT with the dummy account name and password, and passes the SIDs associated with the list of NT groups to the function. The LsaLogonUser function uses the dummy account to log onto the system as though the user were logging on interactively, and returns to the MSN SSP package an NT token for the logon along with an attached list of SIDs passed to the function. The MSN SSP package 54A then stores the NT token and attached SID list, and returns a user-specific context handle to the server application 52.

Thereafter, whenever the server application 52 needs to perform a resource-related service on behalf of the user, the server application calls the ImpersonateSecurityContext function of the MSN SSPI 70B with the user's context handle. Using the context handle, the ImpersonateSecurityContext retrieves the corresponding NT token and SID list, and attaches this NT token and SID list to the calling thread of the server application. This allows the calling thread to impersonate the user as the thread is executed on the WWW server 50.

As will be apparent from the foregoing, the authentication process is completely transparent to the user, with the exception of any additional delay caused by the interchange of messages between the SP site 50 and the Online Broker site 60. This added delay can be minimized by providing a high speed connection between the SP site 50 and the Online Broker site 60.

With reference to the dashed arrows labeled "I" in FIG. 4, billing events are generated by the server application 52 during the course of the user service session, and are added to an active billing log file (not shown) by making API calls to the billing components 54C. The active billing log file is periodically transferred to the Brokering Agent 62, which forwards the log file to the MSN billing system 64A. The billing log file is preferably transferred to MSN over a private, secure channel, but could alternatively be transferred over the Internet. The MSN billing system 64A parses the billing log files and records the specified charges to the accounts of individual users (using the assigned session IDs to identify the users).

With reference to dashed arrows "J" in FIG. 4, user access rights with respect to the SP site 50 are updated by placing an API call to the Sysop Tools package 54D. The Sysop Tools package 54D in-turn establishes a secure connection with the MSN security system 64C, and makes the requested update. By way of example, an SP site which provides multiple fee-based bulletin board systems (BBSs) may have a separate token for each BBS. When a user subscribes to a particular BBS service, the server application 52 would call the Sysop Tools package 54D, specifying both the anonymous session ID of the user and the 32-bit token which corresponds to the requested BBS. The Sysop Tools package 54D would pass this request to the MSN security system 64C, and assuming that the Service Provider has sysop privileges with respect to the token, the MSN security system would update its database to add the token to the user's token list.

With reference to dashed arrow "K" in FIG. 4, users may view the online billing statement either by logging directly onto MSN, or by accessing the MSN billing system 64A via the Internet. In other embodiments, user billing statements may additionally or alternatively be provided to users by email.

While certain preferred embodiments of the invention have been described, these embodiments have been presented by way of example only, and are not intended to limit the scope of the present invention. For example, although the disclosure has focussed on the use of the system and method to provide online services over public, untrusted, distributed networks such as the Internet, it will be appreciated that the disclosed system and method, and various features thereof, can be used to provide online services over other types of distributed networks, including private and hybrid public-private networks. Accordingly, the breadth and scope of the present invention should be defined only in accordance with the following claims and their equivalents.

What is claimed is:

1. A method of providing an online service to a user over a public network, the online service provided by a Service Provider (SP) site to a user computer via the public network, the method comprising the steps of:

sending a request message from the user computer to the SP site over the public network to request the use of the online service;

generating a challenge message at the SP site in response to the request message and sending the challenge message over the public network to the user computer;

generating a response message in the user computer in response to the challenge message and sending the response message over the public network to the SP site, the response message including or being based upon an identifier of the user;

sending at least the response message from the SP site to a remote online broker site, the online broker site having a brokering database which contains account information of registered users of an online brokering service of the online broker site;

processing the response message at the remote online broker site to determine whether the response message is authentic, the step of processing comprising accessing the account information in the brokering database;

sending a verification message from the remote online broker site to the SP site, the verification message indicating whether the response message is authentic;

retrieving access rights data of the user from the brokering database if the response message is authentic, the access rights data specifies a plurality of content categories to which the user has access, the plurality of content categories corresponding to a plurality of different online services offered by the SP site;

sending the access rights data from the online broker site to the SP site;

providing the online service from the SP site to the user computer over the public network if the verification message indicates that the response message is authentic; and denying access by the user to the online service if the verification message indicates that the response message is not authentic.

2. A method as in claim 1, wherein the step of generating a response message comprises obtaining a password of the user.

3. A method as in claim 2, wherein the step of generating the response message further comprises applying a cryptographic algorithm to at least the challenge message such that the resulting response message depends upon both the challenge message and the password.

4. A method as in claim 2, wherein the step of obtaining the password of the user comprises retrieving the password from a password cache on the user computer, the password cache temporarily storing the password following manual entry by the user, the method thereby enabling the user to access multiple SP sites without re-entering the password.

5. A method as in claim 1, further comprising the steps of:

assigning an anonymous identifier to the user at the online broker site and sending the anonymous identifier to the SP site to enable the SP site to anonymously charge the user for an online service; and generating a billing event at the SP site and sending the billing event to the online broker site, the billing event specifying at least (1) the anonymous identifier of the user, and (2) a monetary charge to be applied to an account of the user.

6. A method as in claim 5, further comprising the steps of:

establishing a connection between the user computer and the online broker site; and providing an online billing statement to the user over the connection, the online billing statement reflecting the monetary charge specified in the billing event.

7. A method as in claim 5, further comprising the step of sending a billing statement from the online broker site to the user computer over the public network, the billing statement reflecting the monetary charge specified in the billing event.

8. A method as in claim 1, further comprising the steps of:

sending an access rights update request from the SP site to the remote online broker site, the access rights update request specifying an update to be made by the online brokering service to the access rights of the user; and processing the access rights update request at the online broker site by updating the access rights data of the user stored within the brokering database.

9. A method as in claim 1, further comprising the steps of:

retrieving user-specific preference data of the user from the brokering database and sending the preference data from the online broker site to the SP site, the preference data indicating at least one user-specified preference for the customization of online services; and adjusting the online service provided from the SP site according to the user-specified preference.

10. A method as in claim 9, wherein the preference data includes a connection speed at which the user computer connects to the public network, and wherein the step of adjusting comprises providing the service to the user computer at a speed which is commensurate with the connection speed.

11. A method as in claim 9, wherein the preference data includes a display preference for the display of a particular type of media.

12. A method as in claim 1, further comprising the steps of:

generating a first session key at the user computer;

generating a second session key at the online broker site and sending the second session key to the SP site, the second session key corresponding to the first session key; and using the first and second session keys to encrypt and decrypt message traffic between the user computer and the SP site as the online service is provided to the user computer.

13. A method as in claim 1, wherein the public network comprises the Internet.

14. A method as in claim 1, wherein the steps of passing the request, challenge and response messages over the public network respectively comprise passing the request, challenge and response messages over a private network.

15. A method providing a fee-based online service from a Service Provider (SP) site to a user over a public network while concealing the payment and personal information of the user from the Service Provider, comprising the steps of:

providing an online broker site that provides an online brokering service, the online broker site having a brokering database which contains account information on the user and on other users of the online brokering service, the online broker site located remotely from the SP site; establishing a connection between a computer of the user ("user computer") and the SP site over at least the public network;

generating an encrypted authentication message at the user computer and sending the authentication message to the online broker site via at least the public network;

verifying the authentication message at the online broker site to thereby authenticate the user, the step of verifying comprising accessing the account information of the user stored in brokering database;

generating an anonymous ID at the online broker site and sending the anonymous ID to the SP site to allow the SP site to charge the user for the online service;

providing the online service from the SP site to the user computer over the public network;

retrieving user-specific customization data of the user from the brokering database and sending the customization data from the online broker site to the SP site, the customization data indicating a user-specified preference for the customization of the online service;

adjusting the online service provided from the SP site according to the user-specified preference; and generating a billing event at the SP site and sending the billing event to the online broker site, the billing event specifying at least (1) the anonymous ID, and (2) a monetary charge to be applied to an account of the user.

16. A method as in claim 15, wherein the step of generating an encrypted authentication message comprises the steps of prompting the user for a password and using the password to generate the authentication message, the password stored in the brokering database so that the online brokering service can determine whether the authentication message corresponds to the password.

17. A method as in claim 15, wherein the step of sending the encrypted authentication message to the online broker site comprises the steps of:

sending the authentication message from the user computer to the SP site over the public network; and sending the authentication message from the SP site to the online broker site.

18. A method as in claim 15, further comprising the step of processing the billing event at the online broker site to thereby apply the charge to the account of the user.

19. A method as in claim 18, further comprising the step of providing an account statement from the online broker site to the user computer over at-least the public network, the account statement reflecting the charge specified in the billing event.

20. A method as in claim 15, further comprising the steps of:

retrieving access rights data of the user from the brokering database, the access rights data specifying the access rights of the user with respect to the online service and/or the SP site; and sending the access rights data from the online broker site to the SP site.

21. A method as in claim 20, further comprising the step of interpreting the access rights data at the SP site to determine whether the user is authorized to access a particular content item of the SP site.

22. A method as in claim 20, further comprising the step of sending an access rights update request from the SP site to the online broker site, the access rights update request specifying at least (1) the anonymous ID of the user, and (2) an update to be made by the online brokering service to the access rights data of the user.

23. A method as in claim 15, wherein the customization data includes a connection speed at which the user computer connects to the public network, and wherein the step of adjusting comprises providing the service to the user computer at a speed which generally corresponds to the connection speed.

24. A method as in claim 15, wherein the customization data includes a display preference for the display of a particular type of media.

25. A method as in claim 15, further comprising the steps of:

generating a first session key at the user computer;

generating a second session key at the online broker site and sending the second session key to the SP site, the second session key corresponding to the first session key; and using the first and second session keys to encrypt and decrypt message traffic between the user computer and the SP site as the online service is provided to the user computer.

26. A method as in claim 15, wherein the public network comprises the Internet.

27. A method as in claim 15, wherein the online service comprises a software download service.

28. A method as in claim 15, wherein the online service comprises user access to an online version of a printed publication.

29. A system for allowing users to securely access online service providers over an untrusted distributed network, comprising:

a plurality of Service Provider (SP) sites connected to the distributed network, each SP site running at least one service application to provide an online service to users over the distributed network;

a plurality of user computers connected to the distributed network, each user computer running at least one client application for accessing online services of the SP sites;

an online broker site connected to the plurality of SP sites, the online broker site running at least one brokering application to provide an online brokering service, the online broker site including a user database containing user-specific authentication information of users that have registered to use the online brokering service, the registered users accessing the SP sites from the users computers over the distributed network;

a database which stores user-specific customization data, the customization data specifying preferences of the registered users with respect to the online services of the SP sites, the customization data provided to the SP sites by the online brokering service to enable the SP sites to customize the online services to the preferences of individual registered users; and an authentication protocol for allowing the online brokering service to authenticate registered users in response to user-specific authentication requests from the SP sites, the authentication requests responsive to requests from the user computers to access the online services of the SP sites, the authentication protocol implemented by software components of the user computers, the SP sites, and the online broker site.

30. A system as in claim 29, further comprising a billing system for allowing the SP sites to charge the registered users for accesses to the online services by sending billing events to the online brokering service, the billing system including a centralized database for recording billing events to accounts of the registered users.

31. A system as in claim 30, wherein the billing system includes a billing viewer application running on the user computers, the billing viewer application allowing a registered user to view a personal billing statement stored in the centralized database, the billing statement including charges from multiple different SP sites of the plurality of SP sites.

32. A system as in claim 29, further comprising an access rights database at the online broker site, the access rights database storing access rights data for a plurality of the registered users, the access rights data specifying access rights of the plurality of registered users with respect to the SP sites, the access rights data provided to the SP sites by the online brokering service.

33. A system as in claim 29, wherein the authentication protocol implements a challenge-response protocol.

34. A system as in claim 29, wherein the distributed network comprises the Internet.

35. A method providing a fee-based online service from a Service Provider (SP) site to a user over a distributed network while concealing the payment and personal information of the user from the Service Provider, comprising the steps of:

providing an online broker site that provides an online brokering service, the online broker site having a brokering database which contains account information on the user and on other users of the online brokering service, the online broker site located remotely from the SP site;

sending an access request from a computer of the user ("user computer") over the distributed network to the SP site;

sending an authentication request from the SP site to the online broker site in response to the access request;

prompting the user for a user identifier at the user computer and sending the user identifier to the online broker site;

authenticating the user at the online broker in response to the authentication request, the step of authenticating comprising using the user identifier sent from the user computer to access the account information stored within the brokering database;

sending a verification message from the online broker site to the SP site in response to the authentication request, the verification message indicating whether the step of authenticating was successful;

retrieving access rights data of the user from the brokering database if the step of authenticating is successful, the access rights data specifying a plurality of access rights of the user with respect to the online service and/or the SP site;

sending the plurality of access rights data from the online broker site to the SP site to anonymously inform the SP site of the access rights of the user;

providing the fee-based online service from the SP site to the user computer over the distributed network only if the verification message indicates that the step of authenticating was successful;

generation a billing event at the SP site and sending the billing event to the online broker site, the billing event anonymously identifying the user to the online brokering service, the billing event including a charge for the providing of the online service to the user computer; and updating an account of the user at the online broker site to reflect the charge included within the billing event.

36. A method as in claim 35, further comprising the step of providing an account statement from the online broker site to the user computer over at-least the distributed network, the account statement reflecting the charge included in the billing event.

37. An online brokering service for allowing users of a public network to anonymously purchase online services from Service Provider (SP) sites on the public network, the online brokering service provided from an online broker site that is located remotely from the SP sites, the online brokering service comprising:

a database which contains account information of users that have registered with online brokering service, the account information including at least a unique identifier of each registered user;

a billing system for recording monetary charges to accounts of registered users, the monetary charges corresponding to online services purchased from the SP sites over the public network; and a software package running at the online broker site, the software package performing at least the following functions:
(a) authenticating registered users in response to authentication requests received from the SP sites, the authentication requests generated in response to attempts by registered users to access online services of the SP sites, said authenticating comprising accessing the database to verify user account information;
(b) receiving user-specific billing events from the SP sites and passing the billing events to the billing system to update the accounts of registered users, each billing event specifying at least (1) an anonymous ID of a registered user, and (2) a charge to be applied to the account of the registered user; and
(c) retrieving user-specific access rights data from the database in response to requests from the SP sites and transmitting the access rights data to the SP sites, the access rights data specifying a plurality of content categories or services to which a registered user has access and enabling the SP sites to provide customized access rights to the registered users.

38. An online brokering service as in claim 37, wherein the software package further performs the function of:

retrieving user-specific customization data from the database in response to requests from the SP sites and transmitting the customization data to the SP sites, the customization data indicating user specified preferences for enabling the SP sites to provide user customized online services.

39. An online brokering service as in claim 37, wherein the billing system comprises a software module for allowing the registered user to remotely access an online billing statement, the online billing statement reflecting billing events received by the online broker site from multiple different SP sites.

40. An online brokering service as in claim 37, wherein the public network comprises the Internet.

41. A virtual online services network for allowing users to directly access service provider (SP) sites over a public network, comprising:

an online brokering service running on at least one site of a computer network, the online brokering service storing account and billing information for a plurality of users of the public network, each of the users having a respective account with the online brokering service, the online brokering service providing online access by the users to account-specific billing information;

a plurality of fee-based online services running on a plurality of independent service provider (SP) sites on the public network, the SP sites directly accessible to the users over the public network, each SP site being registered with the online brokering service and being configured to use the online brokering service to authenticate the users when the users connect to the SP sites over the public network, the fee-based services configured to generate account-specific billing events in response to uses of the online services by the users and to forward the billing events to the online brokering service so that the users are billed for the online services from a centralized billing location; and a log-on protocol which allows the users to access the plurality of online services using their respective accounts with the online brokering service, the log-on protocol configured to (1) prompt a user for an account identifier, (2) cache the account identifier during the course of a user log-on session, and (3) use the cached account identifier to access multiple different SP sites, the log-on protocol thereby allowing the user to seemlessly access the plurality of fee-based online services following a single log-on event;

wherein the online brokering service stores user-specific access rights data, and provides the access rights data specifying access rights for a plurality of online services for a specific user to the SP sites in response to requests from the SP sites, and wherein the fee-based online services are configured to use the access rights data to automatically provide user-customized services to the users.

42. A virtual online services network as in claim 41, wherein the log-on protocol is implemented by respective software components stored on (1) the SP sites, (2) the at least one site of the online brokering service, and (3) computers of the users.

43. A virtual online services network as in claim 41, wherein the log-on protocol includes a challenge-response authentication protocol for allowing the SP sites to authenticate the users.

44. A virtual online services network as in claim 41, wherein the public network comprises the Internet.

45. An apparatus comprising:

A broker server operatively connected to a computer network, the broker server having a processor and a computer readable memory, the memory storing broker server implementation software, including customer access software, site linking software to link customers to selected sites on the computer network and at least one data structure;

the at least one data structure including a list of registered customers along with corresponding ID and payment information, and including a list of online sites with their corresponding linking information, the list of online sites being a subset of the sites available to users of the computer network, the at least one data structure further including access rights to a plurality of online services provided by at least one online site within the list of online sites;

whereby the broker server facilitates seamless connection between a selected customer from its list of customers and a selected online site from the listed online sites to create a virtual online service, including providing the selected customer's access rights to the plurality of online services provided by the selected online site.

46. An apparatus as in claim 45, wherein the computer network is a public network which comprises the Internet, and wherein the online sites are World Wide Web sites of the Internet.

* * * * *